(12) United States Patent
Baatz et al.

(10) Patent No.: US 8,523,197 B2
(45) Date of Patent: Sep. 3, 2013

(54) FOLDING TRANSPORT CART

(75) Inventors: Andreas Baatz, Sauensiek (DE); Joyce Tan, Mobile, AL (US); Christian Boe, Farum (DK)

(73) Assignee: Airbus Operations GmbH, Hamburg (DE)

( * ) Notice: Subject to any disclaimer, the term of this patent is extended or adjusted under 35 U.S.C. 154(b) by 128 days.

(21) Appl. No.: 12/736,559

(22) PCT Filed: Apr. 24, 2009

(86) PCT No.: PCT/EP2009/054942
§ 371 (c)(1),
(2), (4) Date: Dec. 7, 2010

(87) PCT Pub. No.: WO2009/135771
PCT Pub. Date: Nov. 12, 2009

(65) Prior Publication Data
US 2011/0089671 A1    Apr. 21, 2011

Related U.S. Application Data

(60) Provisional application No. 61/050,627, filed on May 6, 2008.

(30) Foreign Application Priority Data

May 6, 2008    (DE) .......................... 10 2008 022 379

(51) Int. Cl.
*B62B 1/00* (2006.01)
(52) U.S. Cl.
USPC ............ 280/42; 280/651; 280/639; 280/79.3; 280/638
(58) Field of Classification Search
USPC ................. 280/651, 639, 35, 42, 79.11, 79.3, 280/47.34, 47.35, 638, 647, 646; 211/201, 211/200, 149, 195; 108/99, 115
See application file for complete search history.

(56) References Cited

U.S. PATENT DOCUMENTS 4,339,141 A * 7/1982 Thiboutot ..................... 280/652
4,522,130 A * 6/1985 Worthington ................. 108/159
(Continued)

FOREIGN PATENT DOCUMENTS

DE    94 06 270    6/1994

OTHER PUBLICATIONS

International Search Report for PCT/EP2009/054942, mailed Aug. 12, 2009.
(Continued)

*Primary Examiner* — J. Allen Shriver, II
*Assistant Examiner* — James M Dolak
(74) *Attorney, Agent, or Firm* — Jenkins, Wilson, Taylor & Hunt, P.A.

(57) ABSTRACT

Disclosed herein is a folding transport cart which in a parking configuration has a minimum extension and in an operative configuration has a maximum extension in a transverse direction. A folding transport cart can comprise: two side parts which extend substantially perpendicular to the transverse direction of the transport cart, and a folding base part which comprises two flat base segments which are each connected on one base side axis for articulated movement to one side part and are connected on a common base central axis for articulated movement to one another. In order to ensure reliable folding and unfolding the transport cart can comprise a base locking mechanism for locking the folding base part in the operative configuration and a cover part which is connected for articulated movement to one of the side parts.

13 Claims, 3 Drawing Sheets

(56) References Cited

U.S. PATENT DOCUMENTS

| | | | |
|---|---|---|---|
| 4,705,247 A | 11/1987 | Delmerico | |
| 4,740,010 A * | 4/1988 | Moskovitz | 280/641 |
| 5,040,809 A * | 8/1991 | Yang | 280/42 |
| 5,131,547 A * | 7/1992 | Goldberg | 211/149 |
| 5,829,765 A | 11/1998 | Snider | |
| 6,123,207 A * | 9/2000 | Mast | 211/149 |
| 6,170,855 B1 * | 1/2001 | Bianchetto | 280/651 |
| D452,357 S * | 12/2001 | Stravitz et al. | D34/19 |
| 6,443,481 B1 * | 9/2002 | Stravitz et al. | 280/651 |
| 6,685,199 B2 * | 2/2004 | Stravitz et al. | 280/42 |
| 6,851,564 B2 * | 2/2005 | Ng | 211/149 |
| 7,213,817 B2 * | 5/2007 | Cheung | 280/42 |
| 7,267,358 B2 * | 9/2007 | Chen | 280/642 |
| 7,377,538 B2 * | 5/2008 | Stuart et al. | 280/651 |
| 7,398,978 B2 * | 7/2008 | Cheung | 280/42 |
| 7,494,149 B2 * | 2/2009 | Liu et al. | 280/639 |
| 7,731,221 B2 * | 6/2010 | Bess | 280/651 |
| RE41,763 E * | 9/2010 | Ng | 211/149 |
| 2002/0153707 A1 * | 10/2002 | Kady | 280/652 |
| 2006/0097487 A1 | 5/2006 | Stuart et al. | |
| 2008/0209673 A1 * | 9/2008 | Cooper et al. | 16/45 |
| 2010/0264628 A1 * | 10/2010 | Ohnishi | 280/651 |
| 2010/0269814 A1 * | 10/2010 | May et al. | 126/25 R |
| 2010/0326938 A1 * | 12/2010 | Zhu et al. | 211/149 |
| 2011/0042910 A1 * | 2/2011 | Ceballos-Godefroy | 280/42 |

OTHER PUBLICATIONS

Written Opinion of the International Searching Authority, Mailed Aug. 12, 2009.

German Search Report for 10 2008 022 379.4, mailed Nov. 22, 2008.

English translation of the International Preliminary Report on Patentability and Written Opinion in corresponding PCT Application PCT/EP2009/054942 mailed Nov. 25, 2010.

\* cited by examiner

FOLDING TRANSPORT CART

This application is the U.S. national phase of International Application No. PCT/EP2009/054942, filed 24 Apr. 2009 which designated the US and claims priority to German Application No. 102008022379.4, filed 6 May 2008, and this application claims priority from U.S. Provisional Application No. 61/050,627 filed May 6, 2008; the entire contents of each of the above applications are hereby incorporated by reference.

The invention relates to a folding transport cart which serves by way of example for transporting and displaying goods and articles on board an aircraft. In particular the invention relates to a transport cart according to the preamble of claim 1.

Typical conventional transport carts consist of a housing on rollers and provide in the housing storage room for appliances and goods. In particular such transport carts are used on trains and in aircraft in order to offer passengers meals and drinks at their seat during the journey. For this the transport carts must be able to be manoeuvred within the relevant mode of transport. Owing to the higher passenger numbers in aircraft particularly large volume transport carts are used. Their top side can be used as the work surface. The length of the transport cart is selected as a rule such that it remains manoeuvrable, i.e. the length must not be so great that it is not possible to negotiate narrow corners. The height of the transport cart depends on the one hand on the desired volume of the storage area whilst on the other hand the work surface of the transport cart should be favourably reachable from the ergonomic points of view, i.e. tasks on the work surface should be able to be carried out by the personnel with their backs as straight as possible. The width of the transport cart likewise depends on the manoeuvrability of the transport cart, and here by way of example the width of the aisle between the two rows of seating in an aircraft is a decisive factor.

Transport carts of the said kind are however owing to their large volume often bulky and take up a lot of room when they are not in use and need to be stowed. This room is then no longer available for other purposes. The transport carts are as a rule parked underneath the worktop of the galley kitchen so that the maximum possible height of the transport cart is in turn predetermined by the internal height of the worktop of the galley. In order for the parked transport cart to take up the least possible space in the galley collapsible or folding transport carts have already been proposed in the prior art.

From U.S. Pat. No. 4,705,247 a folding transport cart is known which has two first and two second oblong criss-crossing legs on opposite sides. Each two criss-crossing legs comprise an outer leg and an inner leg which are connected for pivotal movement in their centre part whereby the distant end sections of the legs, which run outwards from the centre section, extend into the free standing position and collapse into a storage position. The centre sections of the pivotally connected legs are provided with opposing cut-in channels which run transversely to one another and fit into one another whereby these legs are arranged in a common plane on each side of the transport cart.

From U.S. Pat. No. 6,443,481 a folding transport cart is known which has a folding frame for supporting a removable container which is positioned thereon. The frame comprises support elements of which each has two legs which extend down from each support element, and a side arm which extends between two of the legs on each of the opposite sides of the frame. The side arms secure the frame in the unfolded opened position in which the support elements are physically spaced from one another in order to support the removable container. The side arms comprise articulated joints in order to fold the side arms into a common plane which lies substantially parallel to each support element. The frame moreover comprises a base which connects the legs of the frame to one another so that a flat platform is formed in the transport cart. The base is foldable substantially into this same common plane in which the side arms are folded so that when folding in the arms and the base the transport cart moves into the closed position.

The said transport carts do indeed work satisfactorily but do not however represent the optimum solution. They are still relatively bulky in their dimensions and in particular folding the transport carts up and down still requires several inter-coordinated actions. Thus each time there is also a certain risk of injury. On the other hand the stability of the transport cart in the opened position must remain absolutely guaranteed and it must be prevented that the transport cart is accidentally folded down through faulty operation when transporting goods.

It is the object of the present invention to provide a transport cart which can be folded open and closed simply and reliably whereby the material and financial expense at manufacture of the transport cart is to be kept as small as possible.

This is achieved by a transport cart according to claim 1. Preferred embodiments of the transport cart form the subject of the dependent claims.

The invention is based on the knowledge that when folding the transport cart in and out several hinges have to be actuated. This basically requires as many handles as there are hinges or joints. In order to reduce this number, according to the invention several further mechanisms are actuated simultaneously by operating one predetermined folding mechanism. For this an actuating device is provided in the transport cart according to the invention for transferring force between a cover part and a base part which is to be locked.

The folding transport cart according to the invention which has in a parking configuration a minimal extension and in an operative configuration a maximum extension in a transverse direction, comprises two side parts which extend substantially perpendicular to the transverse direction of the transport cart, and a folding base part which comprises two flat base segments which are each connected for articulation to one side part on a base side axis and for articulation to one another on a common base central axis so that hey can be folded inwards into the transport cart. The transport cart according to the invention is characterised by a base locking mechanism for locking the inward folding base part in the operative configuration and a cover part which is connected for articulated movement to one of the side parts whereby the base locking mechanism releases the folding base part when the cover part is folded inwards into the transport cart.

Preferred embodiments of the invention have as additional and—where this is technically possible and expedient—as several additional features that:

the base locking mechanism comprises at least one rotatable hook which in the operative configuration of the transport cart holds the base segment opposite the hook at its free end in a substantially horizontal position, the at least one hook is rotatable about the base side axis and the base segment opposite the hook comprises at least one extension arm which is held in the operative configuration by the hook in a substantially horizontal position, at one free end of the extension arm there is a gripper which comprises in particular an eyelet as a counter member to the hook the base locking mechanism comprises at least one actuating rod which transfers a rotational movement of the cover part to the rotatable hook so that this releases the opposite base segment, the hook is pretensioned into a holding position by a pretensioning spring, at least one base segment is pretensioned by a spring about the base side axis into a substantially vertical position to the side part, the two base segments are pretensioned by a spring about the common base central axis into a substantially coplanar position, the cover part comprises a first and a second cover segment which are each connected on a cover side axis for articulated movement to a side part and on a common cover central axis for articulated movement to each other, at least one cover segment is pretensioned by a spring about the cover side axis into a substantially vertical position to the side part, the two cover segments are pretensioned by a spring about the common cover central axis into a substantially coplanar position, the cover part is lockable by a cover locking mechanism in the operative configuration, at least one stabilising joint is provided with three substantially vertical axes underneath the base segments and in the operative configuration of the transport cart has a substantially linear form and in the parking configuration of the transport cart has a substantially isosceles triangular shape, the side parts fit at the ends on castors which are rotatable about a vertical axis wherein each of the castors has a magnet so that adjoining castors stand parallel to one another when their spacing from one another is less than a predetermined distance, the two side parts comprise flat wall elements.

One advantage of the solution according to the invention lies in the fact that folding the transport cart in and out can be carried out by only one person so that two or more people are not required for this every time.

Further features and advantages of the invention are apparent from the following description of preferred embodiments wherein reference is made to the accompanying drawings.

The drawings are not to scale. The same or similar acting elements are provided with the same reference numerals, unless otherwise mentioned.

Figure 1:
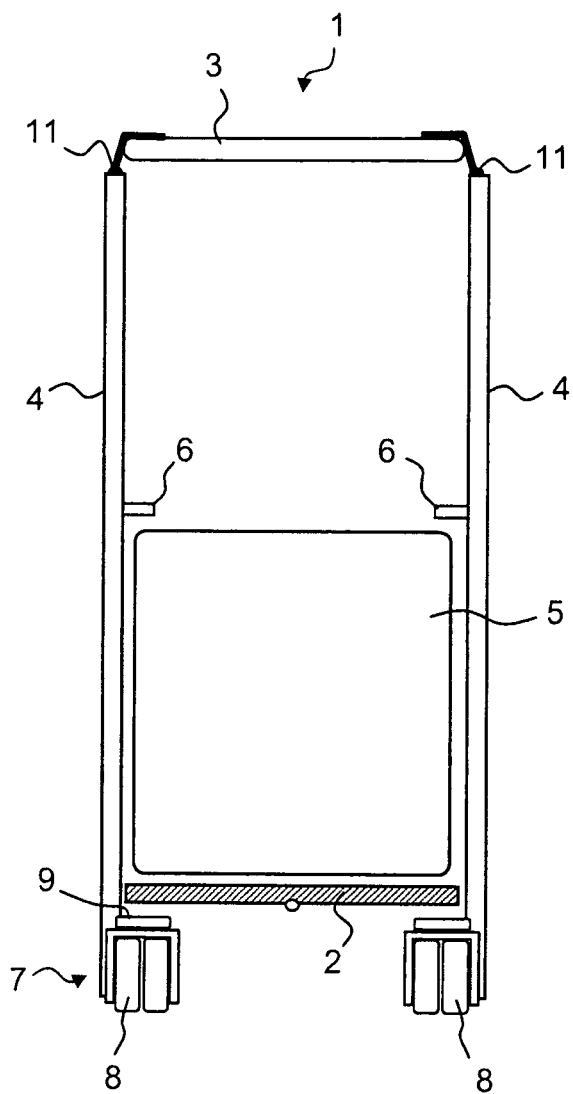
FIG. 1 shows diagrammatically a transport cart according to the invention in a operative configuration in cross-sectional view along a transverse axis.

FIG. 1 shows a transport cart 1 according to the invention, more particularly for use on board aircraft. The transport cart 1 comprises a base part 2 which supports the goods and articles which are to be transported. The transport cart 1 furthermore comprises a cover part 3 which acts as the work surface or further shelf surface. Between the base part 2 and the cover part 3 there are two side parts 4, one on each side. These two side parts 4 extend substantially perpendicular to a transverse direction of the transport cart, i.e. the horizontal direction in the drawing plane.

Goods and transport articles, particularly as the contents of transport containers 5, can be stored in the stowage space formed by the base part 2, cover part 3 and the two side parts 4. Several of these transport containers 5 can thereby be stored in the transport cart 1, namely side by side and one above the other. For the latter case in the illustrated embodiment intermediate supports 6 are installed. These intermediate supports are located roughly halfway up the interior space of the transport cart 1 so that two containers 5 can be stacked one above the other in the transport cart 1.

The transport cart 1 is moved on castors 7. The (double) castors 7 comprise individual rollers or double rollers 8 which are mounted in a cage (not shown) on a horizontal shaft (not shown). The cage for the rollers 8 is in turn able to swivel about a vertical axis so that the running direction of the roller(s) 8 can be readily changed at any time. A swivel joint 9 is provided for such swivel movement. Details on the properties of the swivel joint 7 according to the invention are explained further on. The folding transport cart 1 is shown in FIG. 1 in its operative configuration. In this operative configuration the transport cart has its maximum extension in the transverse direction, i.e. the horizontal direction in the drawing plane.

Figure 2:
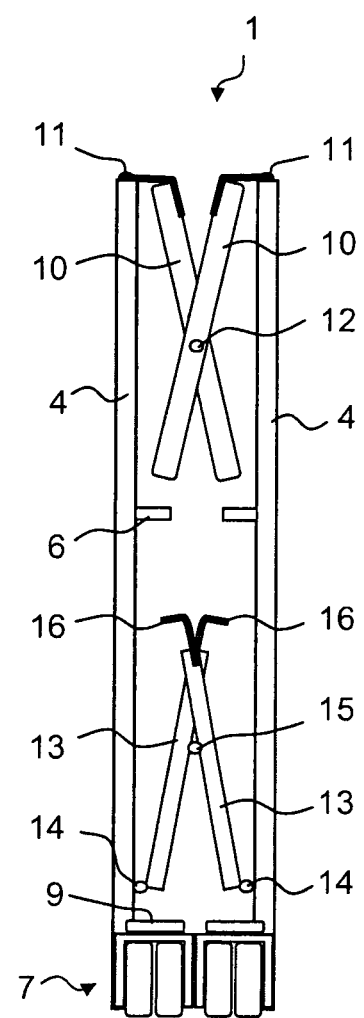
FIG. 2 shows diagrammatically a transport cart according to the invention in a parking configuration in cross-sectional view along a transverse axis.

In FIG. 2 the transport cart 1 is shown in its parking configuration, in which it has a minimum extension in the transverse direction. As can be seen from this illustration in the illustrated embodiment of the transport cart 1 the base part 2 as well as the cover part 3 each consist of two segments. The cover part 3 accordingly comprises two cover segments 10 which cover at least half the distance between the two side parts 4. In the illustrated embodiment the two cover segments 10 complement one another comb-like, i.e. both cover segments 10 have projections (not shown) and recesses (not shown) which engage complementary in one another so that the overall surface of the cover part 3 is smooth and flat. This is however obviously only one possible embodiment and further embodiments will be explained further on.

The cover segments 10 of the cover part 3 are each connected on one cover side axis 11 for articulated movement to one side part 4 so that each cover segment 10 can be brought from a substantially horizontal position into a substantially vertical position and vice versa. In order with the folding movement to create simultaneous transversal movement of the side parts 4 up to one another or away from one another, the two cover segments 10 furthermore are connected on a common cover central axis 12 for articulated movement to each other cover segment 10.

In the illustrated embodiment of the transport cart 1 according to the invention the base part 2 is constructed analogous with the cover part 3. The base part 2 comprises two base segments 13 which cover at least half the distance between the two side parts 4. In the illustrated embodiment the two base segments 13 complement one another comb-like, i.e. the two base segments 13 have projections (not shown) and recesses (not shown) which engage complementary in one another so that the overall surface of the base part 2 is smooth and flat. The base segments 13 of the base part 2 are each connected on a base side axis 14 for articulated movement to a side part 4 so that each base segment 13 can be brought from a substantially horizontal position into a substantially vertical position and vice versa. In order with the folding movement to create simultaneously a transversal movement of the side parts 4 up to one another or away from one another and moreover to assist the folding movement of the cover part 3 the two base segments 13 are furthermore connected on a common base central axis 15 for articulated movement to each other base segment 13.

If starting from the operative configuration of the transport cart in FIG. 1 both the cover part 3 and the base part 2 are folded inwards then the change into the parking configuration of the transport cart according to FIG. 2 is effected. It is apparent from comparing the two FIGS. 1 and 2 that the extension of the transport cart in the parking configuration according to FIG. 2 is substantially less than in the operative configuration according to FIG. 1. A space-saving storage of the transport cart can then be achieved when it is not loaded with goods.

In FIG. 2 a gripper 16 is shown at each free end of the base segments 13 which serves to anchor the base segment 13 in a horizontal position. Details of this gripper will be explained with reference to FIGS. 3 and 4.

As can likewise be seen from FIG. 2 those castors 7 of the transport cart 1 which are located side by side in the transverse direction come very close to one another in the parking configuration, or even touch one another. It can even be the case that the spacing of the side parts 4 in the parking configuration is determined by the width of the castors 7. The minimum distance of the castors 7 and thus of the side parts 4 from one another is then reached when the relevant adjoining castors 7 are aligned parallel to one another. A parallel alignment of the relevant adjoining castors 7 with one another is also advantageous in relation to moving the transport cart 1 in the parking configuration. In order to "force" the parallel alignment of the castors 7 with one another each of the castors 7 has a magnet. When the magnets for all the castors are similarly aligned (e.g. north pole on the left in FIG. 2, south pole on the right) it is thus ensured that adjoining castors 7 stand parallel to one another when their distance from one another is less than a predetermined spacing.

Figures 3, 4:
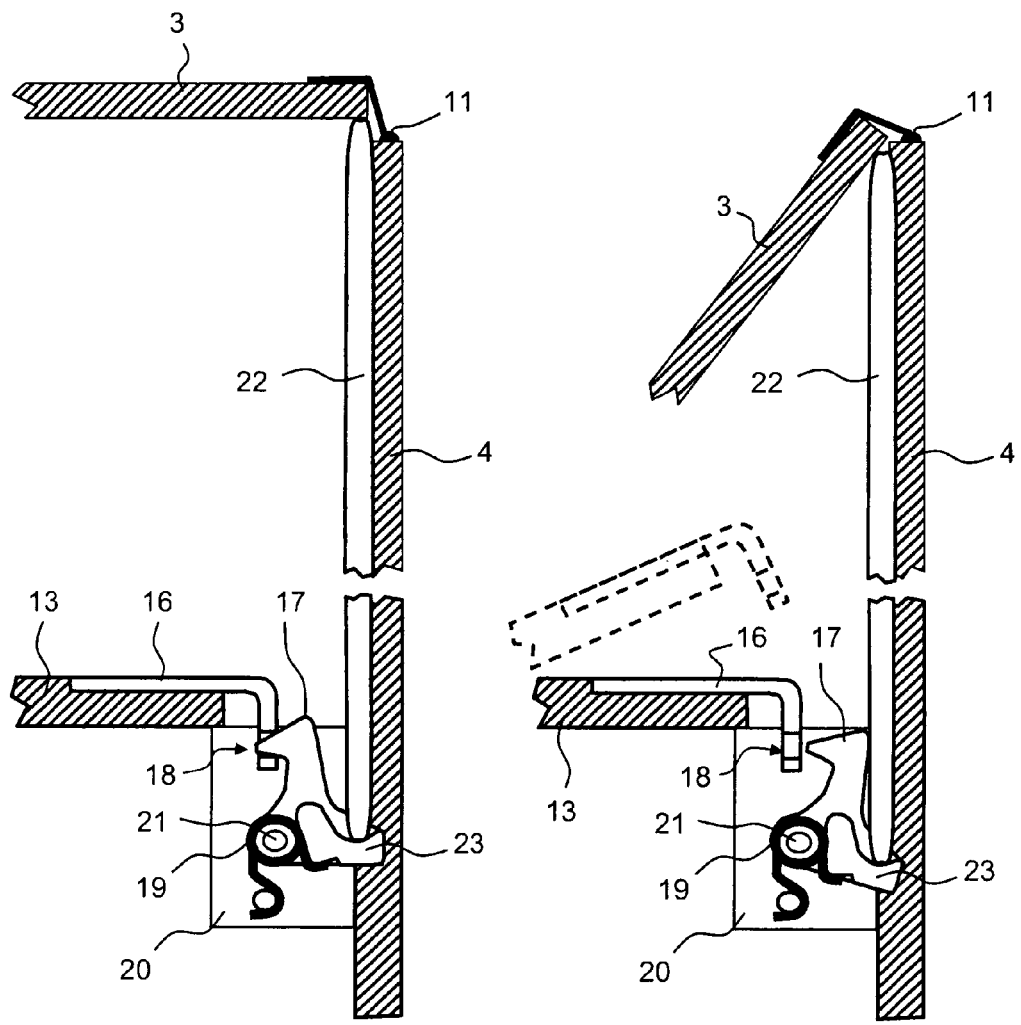
FIG. 3 shows diagrammatically on an enlarged scale a cross-sectional view of an embodiment of the locking mechanism according to the invention in the locked position.
FIG. 4 shows diagrammatically on an enlarged scale a cross-sectional view of an embodiment of the locking mechanism according to the invention in the unlocked position.

It is obvious that the transport cart 1 has to be locked and secured in the operative configuration. On the other hand the transport cart 1 is to be brought into the parking configuration without great effort. For this with the embodiment of the invention according to FIGS. 3 and 4 a base locking mechanism is provided which is actuated by manipulating the cover part 3. FIG. 3 shows an enlarged section of FIG. 1 with additional elements. The transport cart 1 is in the operative configuration. The cover part 3 is mounted substantially horizontal. Similarly the base segment 13 is mounted substantially horizontal. In the illustrated embodiment it has the gripper 16 with which the locking of the base segment 13 in the horizontal position is simplified. The base segment 13 with gripper 16 is held by a hook 17 which engages in an eyelet 18 in the gripper 16. The hook 17 is thereby pressed by a pretensioning spring 19 into the eyelet 18. The hook 17 is mounted on a fastening socket 20 and turns about a rotational axis 21. The fastening socket 20 can extend over the entire length of the side part 4, where applicable provided with recesses at predetermined places. In the illustrated embodiment the base segment 13 lies on the fastening socket 20 for the hook 17. Alternatively the gripper 16 can lie on a rail (not shown) so that movement of the base segment even in the transverse direction is impossible. The rotational axis 21 runs in the socket 20 parallel to and at a given distance from the base side axis 14 (not shown).

The hook 17 is moved by an actuating rod 22 from its rest position which is determined by the pretensioning spring 19.

The actuating rod 22 for this presses on a lug 23 which is firmly connected to the hook 17. This lug 23 has a predetermined distance from the rotational axis 21 of the hook 17 which is selected according to the desired torque for moving the hook 17.

The actuating rod 22 extends from the lug level with the hook 17 up to the cover part 3 at the upper end of the transport cart 1. By manipulating the cover part 3 the hook 17 is consequently turned out of its rest position. This is shown in FIG. 4. Through the pressure of the rod 22 on the lug 23 the hook 17 is turned about its axis 21 and thereby releases the eyelet 18 in the gripper 16. This movement is counteracted only by the pretensioning spring 19 whose force has to be overcome. As soon as the hook 17 has released the eyelet 18 the base segment 13 can be lifted up, which is shown by dotted lines in FIG. 4. The opposing side parts 4 can thus be moved up to one another so that the transport cart 1 is brought into the parking configuration.

It is obvious in this connection that the cover part 3 has to be lockable in the operative configuration in order to prevent accidental release of the base locking mechanism. Accordingly the cover part 3 is provided with a cover locking mechanism (not shown) which holds the cover part 3 in a substantially horizontal position from which it can only be moved by release the cover locking mechanism.

The said sequences of movement can be assisted by correspondingly selected springs. Thus by way of example a cover segment 10 can be pretensioned by a spring about the cover side axis 11 into a substantially vertical position relative to the side part 4. Additionally the two cover segments 10 can also be pretensioned by a spring about the common cover central axis 12 into a substantially coplanar position. This applies similarly also for the base segments. A spring about the base side axis 14 can pretension at least one base segment 13 into a substantially vertical position to the side part 4. Additionally the two base segments 13 can be pretensioned by a spring about the common base central axis 15 into a substantially co-planar position. It is evident here that the reverse effect can also be achieved, namely that it is not the "unfolding" of the transport cart 1 which is supported, but the "collapsing" of the transport cart. In this case the pretensioning directions are all to be turned round so that at the side axes 11 and 14 the inward folding of the segments 10, 13 in the direction of a side part 4 is supported and at the central axes 12, 15 the collapsing of the segments 10, 13 is supported.

Figure 5:
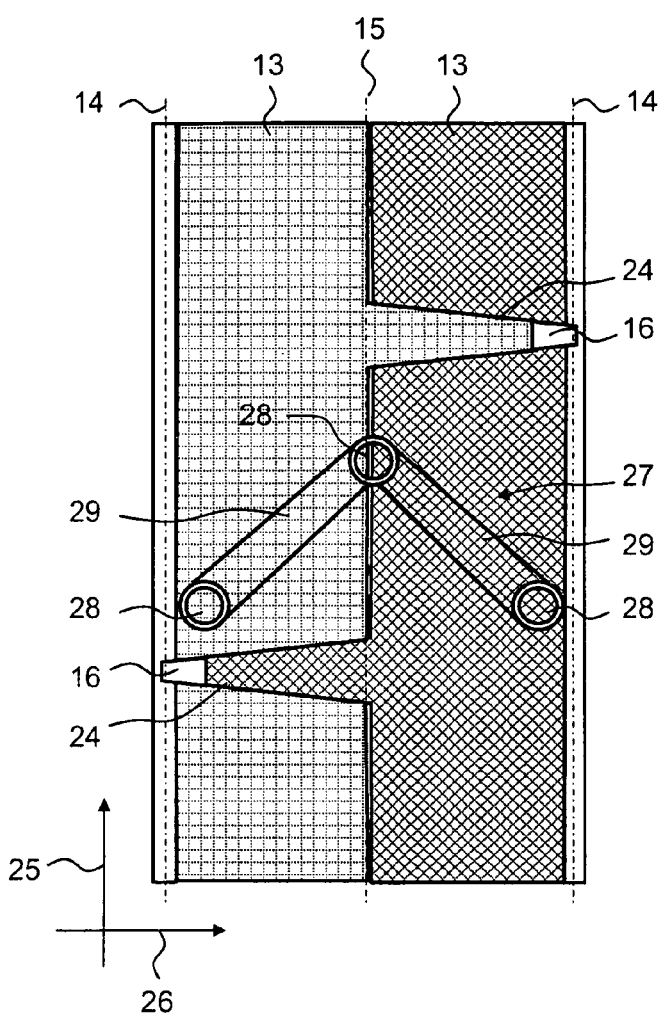
FIG. 5 shows diagrammatically a plan view of an embodiment of the base part according to the invention in the operative configuration.
Figure 6:
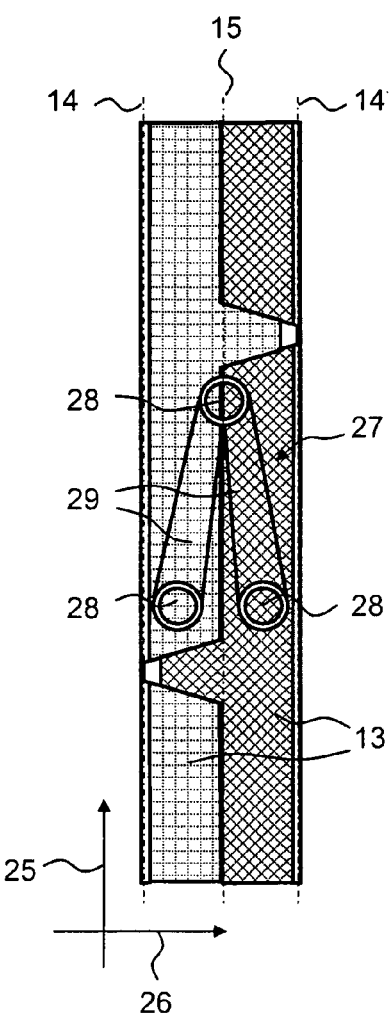
FIG. 6 shows diagrammatically a plan view of an embodiment of the base part according to the invention in the parking configuration.

The movement of the base part 2 when changing from the operative configuration into the parking configuration is described below with reference to FIGS. 5 and 6. FIGS. 5 and 6 show the inward folding base part 2 with two flat base segments 13 in plan view. The base segments 13 extend parallel to one another in a longitudinal direction 25 which points upwards each time in FIGS. 5 and 6. The transverse direction is marked by 26 in FIGS. 5 and 6.

In the operative configuration according to FIG. 5 the two base segments 13 which are each connected on a base side axis 14 for articulated movement to a side part have their maximum extension in the transverse direction 26. Each of the two base segments 13 comprise an extension or engagement arm 24 with which they each overlap their other base segment 13. The gripper 16 is mounted at the free end of the engagement arm 24. Interacting with the gripper 16 the hook 17 holds the base segment 13 in a horizontal position, as was explained in connection with FIGS. 3 and 4. Each other base segment 13 is pressed down by the engagement arm 24 so that even in the event of failure of one hook mechanism the two base segments 13 are held in the horizontal position by the remaining hook mechanism.

Since the two base segments 13 are furthermore connected for articulated movement to one another on a common base central axis 15 they draw the two side parts together when changing from the horizontal to the vertical position. This is apparent from FIG. 6. The base segments 13 are folded inwards into the transport cart, which in the illustration in FIG. 6 leads to a perspective narrowing of the two base segments 13. The two side parts stop moving closing to one another only when the castors touch underneath the side parts.

To stabilise the transport cart 1 in the illustrated embodiment a stabilising joint 27 is shown which is located underneath the base segments. In the illustrated embodiment the stabilising joint 27 comprises two arms 29, which are each connected to a side part 4 by way of an articulated joint 28 and to one another by a further articulated joint 28. As opposed to the connection of the base segments 13 and the cover segments 10 to the side parts 4 in the horizontal direction the axes of the articulated joints 28 lie vertical.

Further advantageous embodiments of the invention will be familiar to the person skilled in the art within the scope of the technical teaching provided above. Thus the two side parts can comprise flat wall elements (not shown) so that the interior space of the transport cart is opaque. Alternatively the side parts can represent just one frame.

REFERENCE NUMERALS

1 Transport cart
2 Base part
3 Cover part
4 Side part
5 Goods container
6 Intermediate support
7 Swivel double roller (castor)
8 Roller
9 Swivel joint
10 Cover segment
11 Cover side axis
12 Cover central axis
13 Base segment
14 Base side axis
15 Base central axis
16 Gripper
17 Hook
18 Eyelet
19 Pretension spring for hook
20 Fastening socket
21 Rotational axis for hook
22 Actuating rod
23 Lug for actuating rod
24 Extension arm, engagement arm
25 Longitudinal direction
26 Transverse direction
27 Stabilising joint
28 Vertical axis
29 Arm

The invention claimed is:

1. A folding transport cart which has a minimum extension in a parking configuration and a maximum extension in a transverse direction in an operative configuration, which comprises:
    two side parts which extend substantially perpendicular to the transverse direction of the transport cart, and
    a fold-in base part which comprises two flat base segments which are connected for articulated movement on different base side axes to different side parts and on a common base central axis for articulated movement to one another so that they can be folded inwards into the transport cart,
    characterised by a base locking mechanism for locking the folding base part in the operative configuration and a cover part which is connected for articulated movement to one of the side parts wherein the base locking mechanism releases the folding base part when the cover part is folded inwards into the transport cart,
    wherein the base locking mechanism comprises at least one rotatable hook which in the operative configuration of the transport cart holds the base segment opposite the hook by a free end of the base segment in a horizontal position, and
    wherein the base locking mechanism comprises at least one actuating rod which transfers a rotational movement of the cover part to the rotatable hook so that the rotatable hook releases the opposing base segment.

2. Folding transport cart according to claim 1 in which the at least one hook is rotatable about a rotational axis running parallel to and at a given distance of one of the base side axes and the base segment opposite the hook comprises at least one extension arm which is held in the operative configuration by the hook in a horizontal position.

3. Folding transport cart according to claim 2 in which a gripper is mounted at one free end of the extension arm and in particular comprises a lug as a counter member to the hook.

4. Folding transport cart according to claim 1 in which the hook is pretensioned by a pretensioning spring into a holding position.

5. Folding transport cart according to claim 1 in which at least one base segment is pretensioned by a spring about one of the base side axes into a vertical position to the side parts.

6. Folding transport cart according to claim 1 in which the two base segments are pretensioned by a spring about the common base central axis into a co-planar position.

7. Folding transport cart according to claim 1 in which the cover part comprises a first and a second cover segment which are each connected on different cover side axes for articulated movement to different side parts and on a common cover central axis for articulated movement to one another.

8. Folding transport cart according to claim 7 in which at least one cover segment is pretensioned by a spring about one of the cover side axes into a vertical position to the side parts.

9. Folding transport cart according to claim 7 in which the two cover segments are pretensioned by a spring about the common cover central axis into a co-planar position.

10. Folding transport cart according to claim 1 in which the cover part is lockable by a cover locking mechanism in the operative configuration.

11. Folding transport cart according to claim 1 in which at least one stabilising articulated joint with three vertical axes is provided underneath the base segments and in the operative configuration of the transport cart has a linear form and in the parking configuration of the transport cart has a isosceles triangular form.

12. Folding transport cart according to claim 1 in which the side parts stand on castors which are rotatable about a vertical axis wherein each of the castors has a magnet so that adjoining castors stand parallel to one another when their distance from each other is less than a predetermined spacing.

13. Folding transport cart according to claim 1 in which the two side parts comprise flat wall elements.

* * * * *

UNITED STATES PATENT AND TRADEMARK OFFICE
CERTIFICATE OF CORRECTION

PATENT NO. : 8,523,197 B2  Page 1 of 1
APPLICATION NO. : 12/736559
DATED : September 3, 2013
INVENTOR(S) : Baatz et al.

It is certified that error appears in the above-identified patent and that said Letters Patent is hereby corrected as shown below:

On the title page, item 86
      replace the PCT 371(c) filing date "Dec. 7, 2010"
      with --Oct. 29, 2010--

Signed and Sealed this
First Day of October, 2013

Teresa Stanek Rea
*Deputy Director of the United States Patent and Trademark Office*